3,644,629
METHOD FOR IMPROVING ANIMAL FEED
EFFICIENCY AND COMPOSITIONS SUIT-
ABLE FOR USE THEREIN
Delbert W. Kolterman, Chadds Ford, Pa., assignor to E. I.
du Pont de Nemours and Company, Wilmington, Del.
No Drawing. Filed Jan. 21, 1969, Ser. No. 792,779
Int. Cl. A61k 27/00
U.S. Cl. 424—273                                    7 Claims

ABSTRACT OF THE DISCLOSURE

This invention relates to the discovery that 5-[2-(methylthio)ethyl]hydantoin can be incorporated in the diet of animals to increase feed efficiency.

Also disclosed are feed compositions and feed concentrates containing 5-[2-(methylthio)ethyl]hydantoin and a process for preparing 5-[2-(methylthio)ethyl]hydantoin from ammonium carbonate monohydrate, sodium cyanide and 3-(methylthio)propanal.

SUMMARY OF THE INVENTION

This invention is based on the discovery that when 5-[2-(methylthio)ethyl]hydantoin is incorporated in the diet of an animal the animal utilizes the feed more efficiently.

More particularly, this invention relates to a method for increasing feed efficiency in animals which comprises incorporating from 0.05 to 1% by weight of 5-[2-(methylthio)ethyl]hydantoin in the diet of said animal.

This invention also relates to feed compositions which are composed of a conventional animal feedstuff fortified with from 0.05 to 1.0% by weight of 5-[2-(methylthio)ethyl]hydantoin.

This invention further relates to animal feed concentrates which are composed of an edible diluent in admixture with from 1% to 95% by weight of 5-[2-(methylthio)ethyl]hydantoin. Preferably, the feed concentrates of this invention will contain from 1% to 50% of 5-[2-(meththio)ethyl]hydantoin.

DESCRIPTION OF THE INVENTION

As stated above this invention is based on the discovery that animals will utilize normal food rations more efficiently when the food ration is fortified with 5-[2-(methylthio)ethyl]hydantoin, hereinafter referred to as "hydantoin-M." This increase in the utilization of the food ration is referred to herein as increased feed efficiency.

It will be understood that the term "increased feed efficiency" as used herein particularly refers to an increase in the productive performance of the animal as reflected in the increased conversion of the food ration to useful products such as milk, meat, wool, etc.

Hydantoin-M is, therefore, useful as a supplement in protein- and/or methionine-defiicent foods, Hydantoin-M is particularly useful as a supplement in conventional low-cost animal feedstuffs such as corn meal or other grains. The use of hydantoin-M to supplement such feedstuffs provides an available source of methionine in the diet and at the same time conserves the available protein in the feed for improved utilization of said protein.

It is well known to the art that low cost animal feeds comprised of animal and vegetable protein sources are often marginally deficient in essential amino acids such as methionine, with the result that feed utilization and general nutrition of the animals fed on such diet is less than desirable. It is well known to the art that a methionine deficiency results in sub-normal growth in your animals and subnormal production of eggs, milk, haircoat, etc., in mature animals. Moreover, whenever the productive performance of the animal is impaired by a dietary deficiency of methionine, there is a corresponding decrease in the efficiency of total diet utilization.

It is well known to the art that a methionine deficiency can be corrected by supplementing the animal diet with sufficient methionine to correct the deficiency.

It has now been discovered that hydantoin-M can be used as a dietary substitute for methionine. Therefore, hydantoin-M can generally be employed to supplement protein or methionine deficient foodstuffs.

Heretofore, hydantoin-M has been known to the art as an intermediate in the synthetic preparation of methionine. However, until the discovery, herein reported, the art contains no teaching or suggestion that hydantoin-M could be employed as a feed supplement in animal nutrition.

The synthesis of hydantoin-M is disclosed in U.S. Pat. No. 2,557,913 issued to John E. Livak and Edgar C. Britton. The patent discloses that in general, hydantoin-M is prepared by admixing 3-(methylthio)propanal with an aqueous solution of ammonium carbonate and an ionizable inorganic cyanide such as sodium cyanide, potassium cyanide or calcium cyanide. The mixture is heated to a temperature of from 40° C. to 120° C. until reaction is complete, is acidified and is then cooled to crystallize the hydantoin-M.

Hydantoin-M can itself be incorporated into animal feeds or can be admixed with other dietary supplements as a feed concentrate to be incorporated into a feed ration. Descriptions of suitable feeds and feed concentrates can be found in the book "Feeds and Feeding" by Frank B. Morrison, published by the Morrison Publishing Company of Ithaca, New York, 1948, 21st. edition. The selection of the particular feed is within the knowledge of the art and will depend of course on the animal, the economics, natural materials available, the surrounding circumstances and the nature of the effect desired, as will be readily understood.

It will be understood that the feed compositions of this invention are comprised of conventional animal feedstuff fortified with from 0.05 to 1.0% by weight of hydantoin-M. Within this range, for best feed utilization, it is preferred that poultry feed compositions will contain from 0.05 to 0.2% by weight of hydantoin-M on the basis of the finished feed. In preparing feed rations for animals such as dairy cattle and sheep, it will often be preferred that the finished feed contain from 0.5 to 1% by weight of hydantoin-M. The particular concentration of hydantoin-M in the finished feed will depend on the naturally available methionine in the feedstuff, and, of course, on the age and condition of the animal being fed.

A particularly important composition according to this feature of the invention is a concentrate, suitable for preparation and sale to a farmer or livestock grower for addition to animal feedstuffs in an appropriate amount. These concentrates ordinarily comprise about 1% to about 95% by weight of hydantoin-M together with a diluent. Generally the diluent will consist of a solid such as ground corn, ground wheat, ground barley, ground oats, wheat bran, soybean oil meal, cottonseed meal, linseed meal, cottonseed hulls and the like.

The feed compositions, as well as the just-described concentrates, can additionally contain other components of feed concentrates on animal feeds, as will be readily understood. Other particularly important additives include proteins, carbohydrates, fats, vitamins, minerals, antibiotics, etc.

Although the disclosure of this invention is primarily directed to the method of increasing feed efficiency of economically important farm animals, it will be understood and apparent to those skilled in the art that hydantoin-M can be used to increase the feed efficiency of any animal that can be benefited by the inclusion of a dietary source of methionine in its feed ration. For example, hydantoin-M can be incorporated in the feed of puppies to improve feed utilization and as a result to increase growth rate. Hydantoin-M can be incorporated in the feed of mature dogs to improve the haircoat. Hydantoin-M can be incorporated in fish food to increase body weight yield in fish farming.

The following examples are presented to further illustrate this invention.

Example 1

A poultry premix of the following formula can be prepared to be used at a rate of 5 lbs. per ton of finished feed.

| Ingredient: | Parts by weight |
|---|---|
| Vitamin $B_{12}$ (6 mg./lb.) | 6.95 |
| Vitamin E acetate (20,000 I.u./lb.) | 9.40 |
| Vitamin A (30-A) | 1.47 |
| Antioxidant (BHT) | 1.25 |
| Ascorbic acid | 0.50 |
| Niacin | 0.25 |
| Folic acid (10%) | 0.05 |
| Calcium pantothenate | 0.04 |
| Pyridoxine hydrochloride | 0.02 |
| Riboflavin | 0.02 |
| Menadione sodium bisulfite | 0.02 |
| Vitamin $D_3$ supplement | 0.02 |
| Thiamin mononitrate | 0.01 |
| Biotin | 0.02 |
| Hydantoin-M | 5.00 |
| | 25.02 |

Example 2

A poultry feed of the following formula can be prepared.

| Ingredient: | Lbs./ton |
|---|---|
| Ground yellow corn | 1226 |
| Stabilized fat | 110 |
| De-hulled soybean meal | 400 |
| Menhaden fish meal | 150 |
| Corn gluten meal | 72 |
| Defluorinated phosphate | 20 |
| Ground limestone | 6 |
| Salt | 9 |
| Vitamin and mineral premix | 6 |
| Hydantoin-M | 1 |
| | 2000 |

Growing chicks are fed the ration of Example 2 and thereafter exhibit a 5%–10% increase in growth to maturity compared to a control group being fed a similar ration without the hydantoin-M.

Example 3

A poultry feed of the following formula can be prepared.

| Ingredient: | Lbs./ton |
|---|---|
| Ground yellow corn | 1190 |
| Stabilized fat | 110 |
| Soybean meal | 550 |
| Corn gluten meal | 70 |
| Defluorinated phosphate | 45 |
| Ground limestone | 16 |
| Salt | 10 |
| Vitamin and mineral premix | 6 |
| Hydantoin-M | 3 |
| | 2000 |

A flock of laying hens, maintained for egg production, are provided 20% less of the food ration of Example 3 per dozen eggs than a similar control flock being fed a similar ration not containing hydantoin-M.

Example 4

A cattle premix of the following formula can be prepared to be used at a rate of 200 lbs./ton of finished feed.

| Ingredient: | Parts by weight |
|---|---|
| Salt, iodized | 36 |
| Vitamin A and D mix | 20 |
| Trace mineral mix | 4 |
| Soy mill feed | 100 |
| Hydantoin-M | 40 |
| | 200 |

Example 5

A cattle supplement of the following formula can be prepared.

| Ingredient: | Parts by weight |
|---|---|
| Soybean meal | 1200 |
| Cane molasses | 280 |
| Dehydrated alfalfa meal | 280 |
| Dicalcium phosphate | 104 |
| Salt, iodized | 36 |
| Hydantoin-M | 100 |
| | 2000 |

Example 6

A cattle supplement of the following formula can be prepared.

| Ingredient: | Parts by weight |
|---|---|
| Cane molasses | 250 |
| Dehydrated alfalfa meal | 850 |
| Urea | 430 |
| Dicalcium phosphate | 200 |
| Salt, iodized | 70 |
| Hydantoin-M | 200 |
| | 2000 |

Example 7

A complete dairy ration of the following formula can be prepared.

| Ingredient: | Lbs./ton |
|---|---|
| Soybean oil meal | 100 |
| Wheat bran | 200 |
| Wheat middlings | 400 |
| Corn gluten feed | 200 |
| Dried brewers' grains | 50 |
| Corn distillers' grains | 100 |
| Hominy feed | 678 |
| Molasses | 160 |
| Calcium carbonate | 20 |
| Dicalcium phosphate | 10 |
| Urea | 40 |
| Salt | 20 |
| Vitamins A and D and trace mineral mix | 2 |
| Hydantoin-M | 20 |
| | 2000 |

Dairy cattle are maintained on the feed ratio of Example 7 with an increase in milk and milk fat production during early lactation over similar cattle being fed an equivalent amount of a similar ration not containing hydantoin-M.

What is claimed is:

1. A method for increasing feed efficiency in animals which comprises orally administering to said animal from 0.05 to 1% of 5-[2-(methylthio)ethyl]hydantoin in the diet.

2. A method for increasing feed efficiency in poultry which comprises orally administering to said poultry from 0.05 to 0.2% of 5-[2-(methylthio)ethyl]hydantoin in the diet.

3. A method for increasing feed efficiency in livestock which comprises orally administering to said livestock from 0.5 to 1% of 5-[2-(methylthio)ethyl]hydantoin in the diet.

4. An animal feed comprising an effective amount of 5-[2-(methylthio)ethyl]hydantoin in combination with an animal feedstuff to increase feed efficiency.

5. An animal feed comprising from 0.05 to 1.0% by weight of 5-[2-(methylthio)ethyl]hydantoin in admixture with an animal feedstuff to increase feed efficiency.

6. A feed concentrate comprising from 1% to 95% by weight of 5-[2-(methylthio)ethyl]hydantoin in admixture with from 99% to 5% by weight of an edible diluent to increase feed efficiency.

7. A feed concentrate comprising from 1% to 50% by weight of 5-[2-(methylthio)ethyl]hydantoin in admixture with from 50% to 99% by weight of edible diluent to increase feed efficiency.

References Cited

Stock et al., Cancer Research, Supplement No. 2, 1955, pp. 179–182, 185, 187 and 314 (No. 6007).

JEROME D. GOLDBERG, Primary Examiner